United States Patent
Chen et al.

[11] Patent Number: 5,617,277
[45] Date of Patent: Apr. 1, 1997

[54] MAGNETORESISTIVE READ HEAD WITH BACK FILLED GAP INSULATION LAYERS

[75] Inventors: Mao-Min Chen; Mohamad T. Krounbi, both of San Jose, Calif.

[73] Assignee: International Business Machines Corporation, Armonk, N.Y.

[21] Appl. No.: 589,813

[22] Filed: Jan. 22, 1996

Related U.S. Application Data

[63] Continuation of Ser. No. 369,559, Jan. 4, 1995, abandoned, which is a continuation of Ser. No. 65,098, May 18, 1993, abandoned.

[51] Int. Cl.$^6$ ........................................ G11B 5/39
[52] U.S. Cl. ............................... 360/113; 360/126
[58] Field of Search .......................... 360/113, 126, 360/125; 29/603, 18

[56] References Cited

U.S. PATENT DOCUMENTS

| | | | |
|---|---|---|---|
| 4,663,685 | 5/1989 | Tsang | 360/113 |
| 4,881,143 | 11/1989 | Bhattacharyya et al. | 360/113 |
| 5,001,586 | 3/1991 | Aboaf et al. | 360/113 |
| 5,079,831 | 1/1992 | Reid | 360/113 |
| 5,115,364 | 5/1992 | Somers | 360/113 |
| 5,247,413 | 9/1993 | Shibata et al. | 360/113 |
| 5,270,892 | 12/1993 | Naberhuis | 360/113 |
| 5,272,582 | 12/1993 | Shibata et al. | 360/113 |
| 5,285,339 | 2/1994 | Chen et al. | 360/113 |
| 5,296,993 | 3/1994 | Aboaf et al. | 360/126 |
| 5,371,643 | 12/1994 | Yuito et al. | 360/113 |
| 5,568,335 | 10/1996 | Fontana et al. | 360/113 |

*Primary Examiner*—Stuart S. Levy
*Assistant Examiner*—Kevin M. Watkins
*Attorney, Agent, or Firm*—Leslie G. Murray

[57] ABSTRACT

A magnetic disk storage system with high linear resolution magnetoresistive (MR) head or heads comprising a dielectric substrate, a first magnetic shield, a first gap insulation layer, an MR stripe element, conductive leads, a second gap insulation layer, and a second magnetic shield. Back-fill layers of insulation material are deposited on the first gap insulation layer adjacent the MR element and/or on the second gap insulation layer in thicknesses substantially sufficient to at least in part replace insulation material removed during the various processing steps to ensure against short circuiting of the MR element. The MR element preferably is a trilayer comprising a soft MR sensing layer biased at an acute angle to the lengthwise dimension of the element but free to rotate therefrom according to the magnitude and direction of applied magnetic field; a soft magnetic or hard magnetic layer with magnetization fixed in a direction perpendicular to the lengthwise direction of the MR element; and a spacer layer separating these two layers.

17 Claims, 1 Drawing Sheet

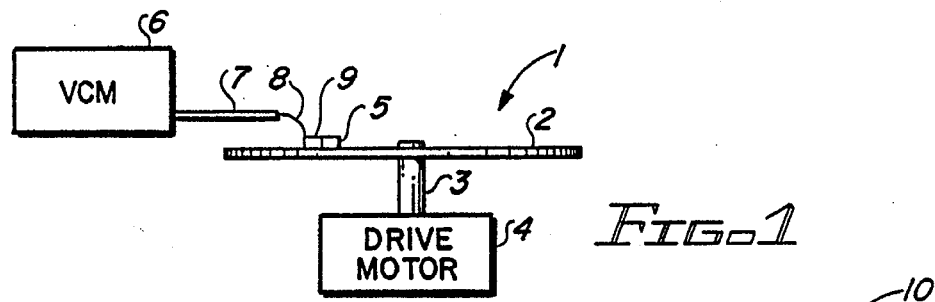
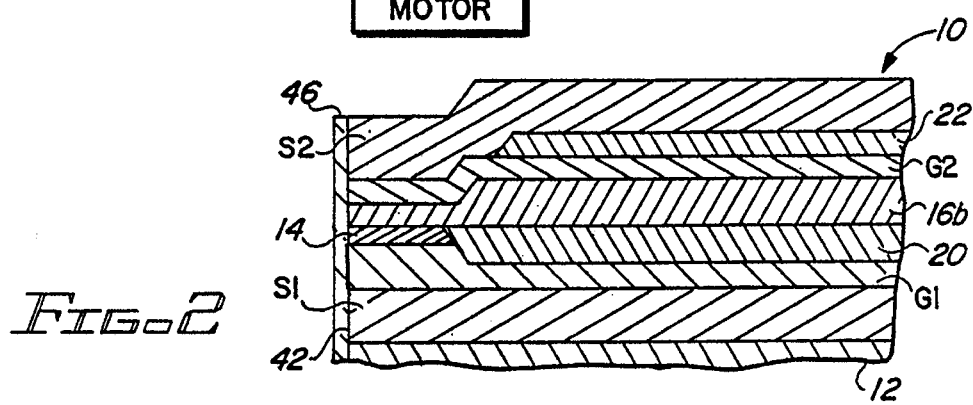
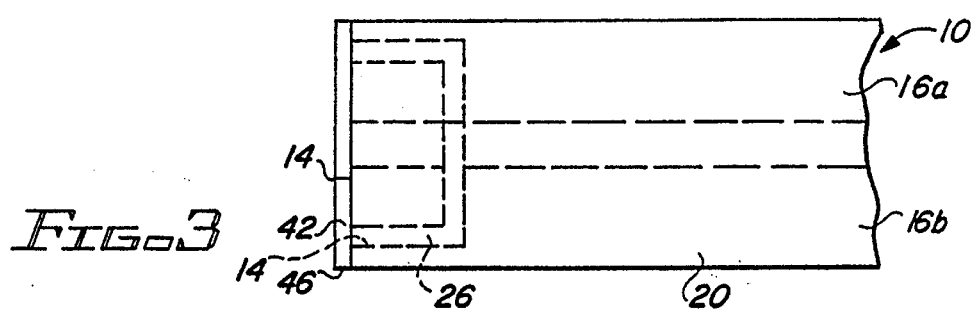
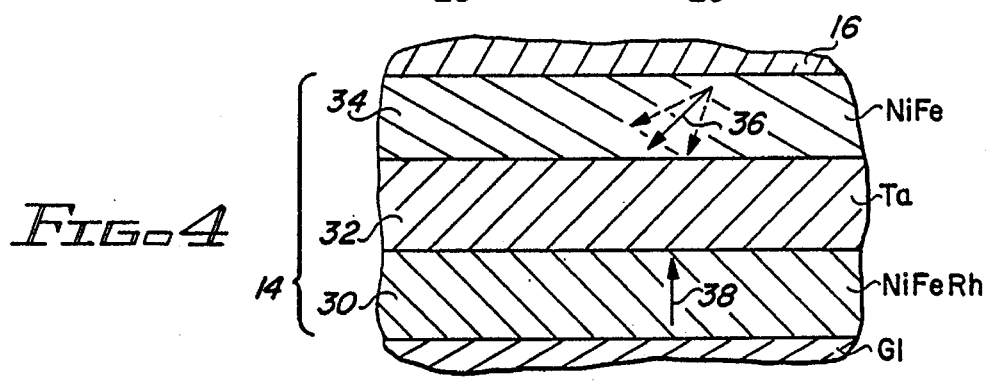
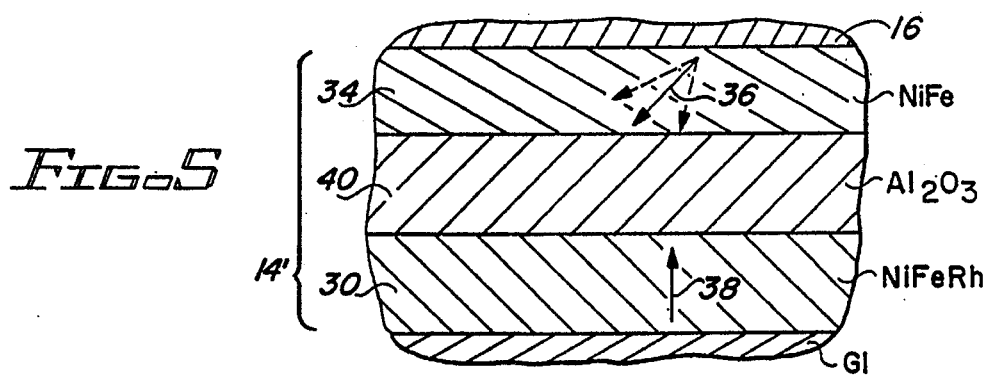

MAGNETORESISTIVE READ HEAD WITH BACK FILLED GAP INSULATION LAYERS

This is a continuation of application Ser. No. 08/369,559 filed on Jan. 4, 1995, now abandoned, which is a continuation of application Ser. No. 08/065,098 filed on May 18, 1993 now abandoned.

FIELD OF THE INVENTION

This invention relates to magnetic disk storage systems, and more particularly to such systems including high linear resolution magnetoresistive (MR) read transducers, commonly called heads, that increase insulation protection between the shields and conductive leads and can provide an improved output signal.

BACKGROUND OF THE INVENTION

Commonly assigned U.S. Pat. No. 4,663,685 discloses an MR read head comprising an active central region and passive end regions. Each passive region comprises a respective conductor lead and suitable means for longitudinally biasing the head. A soft magnetic film is separated from the MR layer by a thin spacer layer to provide a transverse bias of approximately 45 degrees in the active central region of the MR layer. Magnetic shields, which are separated by insulating material from the conductor leads and MR head, respectively, minimize the effects of stray magnetic flux that would decrease the resolution of the read back signal. This MR head configuration operates very satisfactorily when very high linear recording densities are not required.

However, the combined thickness of the gap insulation layers and MR element defines the linear bit resolution of the head. Thus, in order to fabricate high linear recording density heads the thicknesses of these gap layers must be substantially reduced. The electrical insulation properties of the gap layers, as deposited, may be adequate to isolate the MR element and shield. However, the thicknesses of these alumina gap layers (which are deposited as very thin films) are reduced by subtractively etching (e.g., ion milling) during patterning of the MR element and by developer etching during photoprocessing to form the conductor leads. The total alumina removed depends upon the degree of overetching that is required to ensure proper pattern definition during these two steps.

It will be apparent that as the initial thickness of the gap layers is reduced to achieve higher linear resolution, the thickness of the alumina thin films that separate the conductor leads from the respective shields can easily become insufficient to provide the necessary electrical insulation. If this occurs, the MR element can be electrically shorted to either or both of the shields and render the MR head inoperable.

SUMMARY OF THE INVENTION

A magnetic disk storage system embodying the invention comprises an MR read transducer or head which comprises on a dielectric substrate, a first magnetic shield, a first gap insulation layer, an MR stripe element, conductive leads, a second gap insulation layer, and a second magnetic shield. To enable fabrication of high linear resolution MR heads, back-fill layers of insulation material are deposited on the first gap insulation layer and/or second gap insulation layer in thicknesses substantially sufficient to at least in part replace insulation material removed during the various processing steps to ensure against short circuiting of the MR element.

More specifically, one back-fill insulation layer is interposed between the leads and first gap insulation layer adjacent the MR element, and the other back-fill insulation layer is interposed between the second gap insulation layer and second shield adjacent the MR element.

The MR element preferably comprises a soft magnetic MR layer biased in a direction at an acute angle (preferably about 45 degrees) to the lengthwise dimension of the element but free to rotate therefrom according to the magnitude and direction of applied magnetic field; a soft magnetic or hard magnetic layer with the magnetization fixed in a direction perpendicular to the lengthwise direction of the MR element; and a spacer layer separating these two layers. The spacer layer may be of nonmagnetic metallic material; or it may be of an insulating material to significantly improve the output signal of the MR head by ensuring that read current will pass only through the soft magnetic MR sensing layer without shunting current through the other two layers.

BRIEF DESCRIPTION OF THE DRAWINGS

FIG. 1 is a schematic diagram of a magnetic disk storage system embodying the invention.

FIG. 2 is a sectional view of an MR read head forming part of the magnetic storage system depicted in FIG. 1.

FIG. 3 is a top view depicting an important feature of the MR head shown in FIG. 2.

FIGS. 4 and 5 are fragmentary views to enlarged scale which respectively depict alternative configurations of a trilayered MR element for use in the MR heads shown in FIGS. 2 and 3.

DESCRIPTION OF THE PREFERRED EMBODIMENTS

As illustrated in FIG. 1, a magnetic disk storage system 1 embodying the invention comprises a rotatable magnetic disk 2 supported on a spindle 3 and rotated by a disk drive motor 4. A composite magnetic inductive write/magnetoresistive read head 5 is movable relative to the disk by an actuator means for writing and reading magnetic data on tracks (not shown) on the disk. As illustrated, the actuator means comprises a voice coil motor 6 that acts through an actuator arm 7, a suspension 8, and a slider 9 to move the head 5 radially of the disk.

As illustrated in FIGS. 2 and 3, composite head 5 includes a magnetoresistive (MR) read head 10 comprising on a dielectric substrate 12, a magnetic shield S1, a first gap insulation layer G1, an MR layer or trilayer constituting an MR stripe element 14, conductive leads 16a, 16b, a second gap insulation layer G2, and a magnetic shield S2.

According to a feature in the invention, a back-fill insulation layer 20 is interposed between leads 16a, 16b and gap insulation layer G1 adjacent MR element 14. Also a back-fill insulation layer 22 is interposed between the gap insulation layer G2 and shield S2 adjacent MR element 14. The purpose of these back-fill insulation layers 20, 22 is to compensate for and at least in part replace insulation material removed during the various processing steps in order to prevent short circuiting of MR element 14.

MR head 10 is fabricated by depositing on substrate 12, first the shield layer S1, then the gap insulation layer G1, then preferably the layer or layers that will provide the MR element 14. A photoresist, preferably a bilayer photoresist, is next applied over the last-mentioned layer or layers.

After exposure and development of the photoresist to form the MR stripe element 14, the MR layer(s) are subtractively etched (e.g., ion milled) to define the precise configuration of the MR element. The area under MR element 14 will have the insulation thickness of gap layer G1. However, as a result of etching to a depth sufficient to ensure proper and precise definition of the MR element, the area adjacent and outside MR element 14, which is where the conductive leads 16a and 16b and other pattern are located, will have reduced insulation thickness.

According to one feature of the invention, a back-fill layer 20 of additional alumina insulation material is deposited in the area outside the now defined MR element 14, preferably using a mask in the form of a bilayer lift-off resist. This additional material replaces the insulation material removed from the gap layer G1 during patterning of MR element 14. The thickness of this additional insulation material preferably is at least equal to the amount of that removed. The lift-off resist is then removed.

Photoresist, preferably a bilayer photoresist, is then applied on MR element 14 and back-fill insulation layer 20 to define the areas in which the exchange (hard magnetic) bias and leads 16a, 16b are to be formed by developer etching of the photoresist. As a result of exposure and developing of the photoresist, the alumina thickness will be reduced at the developed areas; however, insulation integrity will be maintained and preserved due to the increased thickness of insulation material in these areas. After the exchange bias and lead materials are deposited, insulation material, such as alumina, is then deposited over the conductive leads 16a, 16b and MR element 14 to form the second gap insulation layer G2.

According to another feature of the invention, a layer 22 of additional insulation material is deposited only on that portion of the layer G2 adjacent (i.e., outside) MR element 14 using a bilayer lift-off resist. The resist is then lifted off. The additional insulation layer 22, as deposited, has a thickness sufficient to ensure insulation integrity from electrical short circuits due to pin holes or inadequate edge definition. Finally, magnetic shield material is deposited over the second gap layer G2 and additional layer 22 to form the second shield layer S2. The shield layers S1 and S2, as in the prior art, are separated by insulation material from the MR element 14 and leads 16a, 16b, respectively, to minimize the effects of stray magnetic flux that would reduce the resolution of the read back signal from head 10.

It will thus be seen that the MR element 14 is interposed between and directly contacts the gap layer G1 and leads 16a, 16b. Also, there will be no added insulation material of layer 20 in the area 26 (FIG. 3) surrounding the MR element.

MR element 14 preferably is formed from a trilayer of material. As illustrated in FIG. 4, the trilayer MR element 14 consists of a layer 30 of a ferromagnetic material, such as NiFeRh, deposited on insulation layer G1, on which is deposited a layer 32 of nonmagnetic spacer material, such as Ta, and on which thereafter is deposited an MR layer 34 of soft ferromagnetic material, such as NiFe. Soft MR layer 34 is biased at approximately 45 degrees to the lengthwise dimension of the element 14, as shown by arrow 36, and free to rotate therefrom according to the direction and magnitude of applied magnetic field. Layer 30 has its direction of magnetization fixed in the direction of arrow 38.

According to still another feature of the invention, the MR element 14' illustrated in FIG. 5 differs from that of FIG. 4 in that a spacer layer 40 of insulating material such as alumina ($Al_2O_3$), is substituted for the nonmagnetic metallic Ta layer 32, and layer 20 covers the exposed edges of the layers 30, 40 and 34.

The MR element 14' with this configuration significantly improves the output signal of MR head 10 by ensuring that read current will pass only through MR layer 34 without shunting current through layers 30 and 40. The lapped air bearing surface (ABS) 42 (FIG. 2) of MR head 10 preferably is overcoated with a coating 46 having high electrical resistivity to further protect and ensure against shunting between the NiFe MR layer 34 and NiFeRh layer 30.

It will be apparent that either or both of the back-fill insulation layers 20, 22 may be deposited. Their respective thicknesses will depend upon the thicknesses of insulating material removed from gap insulation layers G1 and/or G2 during the various processing steps.

Also insulation materials other than alumina and ferromagnetic materials other than NiFe or NiFeRh and nonmagnetic spacer materials other than Ta may be used, if preferred.

While the invention has been shown and described with respect to preferred embodiments thereof, it will be understood by those skilled in the art that changes in form and detail may be made without departing from the scope and teaching of the invention. Accordingly, the MR head and method of fabricating same herein disclosed are to be considered merely as illustrative, and the invention is to be limited only as specified in the claims.

We claim:

1. A magnetoresistive read transducer having an air bearing surface, comprising:

a magnetic shield layer having an edge exposed at said air bearing surface and extending from said air bearing surface;

a gap layer of insulating material formed on and overlaying said magnetic shield layer;

a magnetoresistive element formed on said gap layer having a first edge exposed at said air bearing surface and a second edge spaced from said air bearing surface, said magnetoresistive element separated from said magnetic shield layer by said gap layer, a portion of said gap layer being removed during formation of the magnetoresistive element;

a back-fill layer of insulating material extending from said magnetoresistive element second edge away from said air bearing surface and overlaying said gap layer, said back-fill layer having a thickness at least as great as the thickness of said portion of said gap layer; and a pair of conductive leads electrically contacting said magnetoresistive element in spaced relationship extending away from said air bearing surface and overlaying said magnetoresistive element and said back-fill layer, said back-fill layer and said gap layer insulating said conductive leads from said magnetic shield layer.

2. A magnetoresistive read transducer as in claim 1 wherein said magnetoresistive element comprises:

a first layer of ferromagnetic material;

a second layer of ferromagnetic material; and a nonmagnetic spacer layer separating said first and second ferromagnetic layers.

3. A magnetoresistive read transducer as in claim 2 wherein said first ferromagnetic layer comprises nickel-iron-rhodium and said second ferromagnetic layer comprises nickel-iron.

4. A magnetoresistive read transducer as in claim 3 wherein said nonmagnetic spacer layer comprises tantalum.

5. A magnetoresistive read transducer as in claim 3 wherein said nonmagnetic spacer layer comprises alumina ($Al_2O_3$).

6. A magnetic transducer including an inductive write head and a magnetoresistive read head and having an air bearing surface, said magnetoresistive read head comprising:

- a first magnetic shield layer having an edge exposed at said air bearing surface and extending away from said air bearing surface;
- a first gap layer of insulating material formed on and overlaying said first magnetic shield layer;
- a magnetoresistive element formed on said first gap layer having a first edge exposed at said air bearing surface and a second edge spaced from said air bearing surface, said magnetoresistive element separated and spaced from said first magnetic shield layer by said first gap layer, a portion of said first gap layer being removed during formation of the magnetoresistive element;
- a first back-fill layer of insulating material extending from said magnetoresistive element second edge away from said air bearing surface and overlaying said first gap layer, said first back-fill layer having a thickness at least as great as the thickness of said portion of said first gap layer;
- a pair of electrically conductive leads electrically contacting said magnetoresistive element at spaced positions and extending away from said air bearing surface, said conductive leads overlaying said magnetoresistive element and said first back-fill layer, said first back-fill layer and said gap layer insulating said conductive leads from said first magnetic shield layer;
- a second gap layer of insulating material overlaying said magnetoresistive element and said conductive leads; and
- a second magnetic shield layer having an edge exposed at said air bearing surface, said second magnetic shield layer extending from said air bearing surface and overlaying said second gap layer, said magnetoresistive element and said conductive leads separated and spaced from said second magnetic shield layer by said second gap layer.

7. A magnetic transducer as in claim 6 wherein said magnetoresistive read head further comprises a second back-fill layer of insulating material overlaying said second gap layer and extending from said magnetoresistive element second edge away from said air bearing surface, that portion of said second magnetic shield layer extending from said magnetoresistive element second edge being separated and spaced from said second gap layer by said second back-fill layer.

8. A magnetic transducer as in claim 7 wherein said first and second back-fill layers comprise alumina ($Al_2O_3$).

9. A magnetic transducer as in claim 6 wherein said first back-fill layer comprises alumina ($Al_2O_3$).

10. A magnetic transducer as in claim 6 wherein said magnetoresistive element comprises:

- a first layer of ferromagnetic material;
- a second layer of ferromagnetic material; and
- a nonmagnetic spacer layer separating said first and second ferromagnetic layers.

11. A magnetic transducer as in claim 10 wherein said first ferromagnetic layer comprises nickel-iron-rhodium and said second ferromagnetic layer comprises nickel-iron.

12. A magnetic transducer as in claim 11 wherein said nonmagnetic spacer layer comprises tantalum.

13. A magnetic transducer as in claim 11 wherein said nonmagnetic spacer layer comprises alumina ($Al_2O_3$).

14. A magnetic storage system comprising:

- at least one rotatable magnetic storage disk having a plurality of tracks for recording of data;
- at least one magnetic transducer maintained in a spaced position relative to said magnetic storage disk during relative motion between said magnetic storage disk and said magnetic transducer, said magnetic transducer including a magnetoresistive read head comprising:
- a first magnetic shield layer having an edge exposed at an air bearing surface and extending away from said air bearing surface;
- a first gap layer of insulating material formed on and overlaying said first magnetic shield layer;
- a magnetoresistive element formed on said first gap layer having a first edge exposed at said air bearing surface and a second edge spaced from said air bearing surface, said magnetoresistive element separated and spaced from said first magnetic shield layer by said first gap layer, a portion of said first gap layer being removed during formation of the magnetoresistive element;
- a first back-fill layer of insulating material extending from said magnetoresistive element second edge away from said air bearing surface and overlaying said first gap layer, said first back-fill layer having a thickness at least as great as the thickness of said portion of said first gap layer;
- a pair of spaced electrically conductive leads electrically contacting said magnetoresistive element at spaced positions and extending away from said air bearing surface, said conductive leads overlaying said magnetoresistive element and said first back-fill layer, said first back-fill layer and said gap layer insulating said conductive leads from said first magnetic shield layer;
- a second gap layer of insulating material overlaying said magnetoresistive element and said conductive leads; and
- a second magnetic shield layer having an edge exposed at said air bearing surface, said second magnetic shield layer extending from said air bearing surface and overlaying said second gap layer, said magnetoresistive element and said conductive leads separated and spaced from said second magnetic shield layer by said second gap layer; and
- actuator means coupled to each magnetic transducer for moving each magnetic transducer relative to an associated magnetic storage disk for sensing data recorded on selected tracks of said magnetic storage disk.

15. A magnetic storage system as in claim 14 wherein said magnetoresistive read head further comprises a second back-fill layer of insulating material overlaying said second gap layer and extending from said magnetoresistive element second edge away from said air bearing surface, that portion of said second magnetic shield layer extending from said magnetoresistive element second edge being separated and spaced from said second gap layer by said second back-fill layer.

16. A magnetic storage system as in claim 15 wherein said first and second back-fill layers comprise alumina ($Al_2O_3$).

17. A magnetic storage system as in claim 14 wherein said first back-fill layer comprises alumina ($Al_2O_3$).

* * * * *